(12) United States Patent
Katayama et al.

(10) Patent No.: US 7,488,454 B2
(45) Date of Patent: Feb. 10, 2009

(54) MICROCHANNEL STRUCTURE BODY

(75) Inventors: Koji Katayama, Yamato (JP); Toru Futami, Yokohama (JP)

(73) Assignee: Tosoh Corporation, Shunan-shi (JP)

( * ) Notice: Subject to any disclaimer, the term of this patent is extended or adjusted under 35 U.S.C. 154(b) by 456 days.

(21) Appl. No.: 10/548,600

(22) PCT Filed: Mar. 18, 2004

(86) PCT No.: PCT/JP2004/003683

§ 371 (c)(1),
(2), (4) Date: Sep. 13, 2005

(87) PCT Pub. No.: WO2004/082823

PCT Pub. Date: Sep. 30, 2004

(65) Prior Publication Data

US 2006/0171867 A1 Aug. 3, 2006

(30) Foreign Application Priority Data

Mar. 19, 2003 (JP) ............................. 2003-075899

(51) Int. Cl.
*B01J 8/00* (2006.01)
(52) U.S. Cl. .................. 422/129; 422/221; 422/224
(58) Field of Classification Search ................ 422/129, 422/100, 190, 221, 224
See application file for complete search history.

(56) References Cited

U.S. PATENT DOCUMENTS

| 4,894,146 | A * | 1/1990 | Giddings .................. 209/12.2 |
| 6,932,951 | B1 * | 8/2005 | Losey et al. ................. 422/211 |
| 2002/0106311 | A1 * | 8/2002 | Golbig et al. ............... 422/130 |
| 2003/0105172 | A1 * | 6/2003 | Bowe et al. ................. 518/728 |
| 2004/0034266 | A1 * | 2/2004 | Brophy et al. .............. 585/658 |
| 2005/0087767 | A1 * | 4/2005 | Fitzgerald et al. ........... 257/200 |

FOREIGN PATENT DOCUMENTS

| EP | 1 038 575 A2 | 9/2000 |
| EP | 1 281 922 A2 | 2/2003 |
| EP | 163282 | * 3/2006 |
| JP | 10-083988 | 3/1998 |
| JP | 2001-521816 | 11/2001 |
| JP | 2002-292275 | 10/2002 |

(Continued)

OTHER PUBLICATIONS

Stefanie Walter, et al., "Fluid Dynamics in Microstructure Reactors", Chemical Engineering Technology, XP002461951, vol. 71, 1999, pp. 447-455 (with English translation).

(Continued)

*Primary Examiner*—N. Bhat
(74) *Attorney, Agent, or Firm*—Oblon, Spivak, McClelland, Maier & Neustadt, P.C.

(57) ABSTRACT

A fine channel device, having an inlet opening for introducing a gas and an inlet path interconnecting with this inlet opening, a fine channel interconnecting with the inlet path, a discharge path interconnecting with the fine channel, and a discharge opening interconnecting with this discharge path. The inner diameter of the inlet path is greater than that of the fine channel, and either increases gradually, or remains identical, with increasing distance from the position where the inlet opening and the inlet path are in interconnection with each other.

16 Claims, 9 Drawing Sheets

FOREIGN PATENT DOCUMENTS

JP    2003-48701       2/2003
WO    WO 02/072252 A1  9/2002

OTHER PUBLICATIONS

Peter Claus, et al., Miniaturization of screening devices for the combinatorial development of heterogeneous catalysts, Catalysis Today, XP001064935, vol. 67, No. 4, Jun. 15, 2001, pp. 319-339.

J.M. Commenge, et al., "Optimal Design for Flow Uniformity in Microchannel Reactors", Aiche Journal, XP002461952, vol. 48, No. 2, Feb. 2002, pp. 345-358.

H. Löwe, et al., "State-of-the-art in microreaction technology: concepts, manufacturing and applications", Electrochimica Acta, XP002461953, vol. 44, 1999, pp. 3679-3689.

Hideaki Hisamoto et al, "Fast and high conversion phase-transfer synthesis exploiting the liquid-liquid interface formed in a microchannel chip", Chem. Commun., pp. 2662-2663, 2001.

* cited by examiner

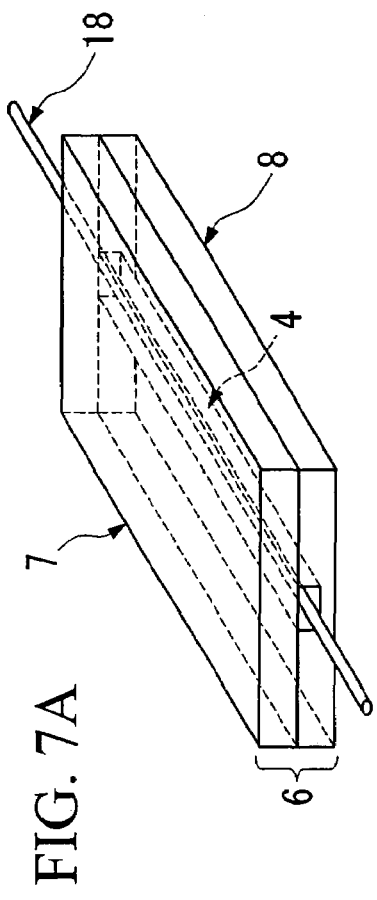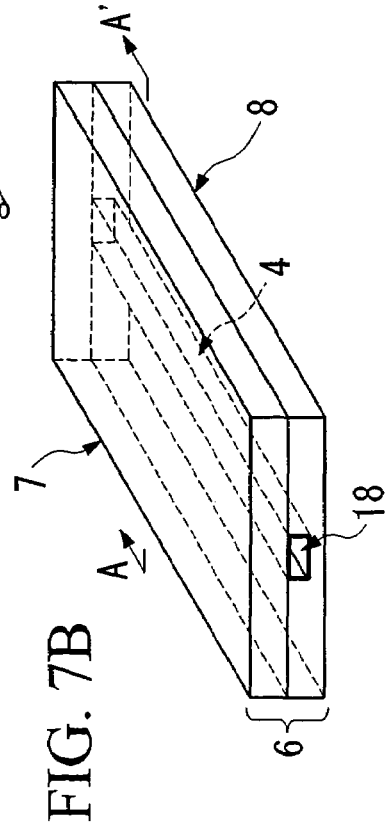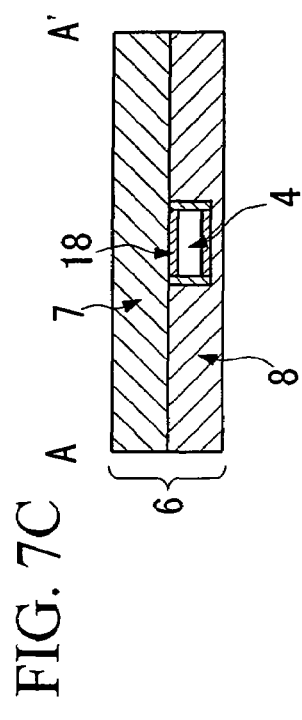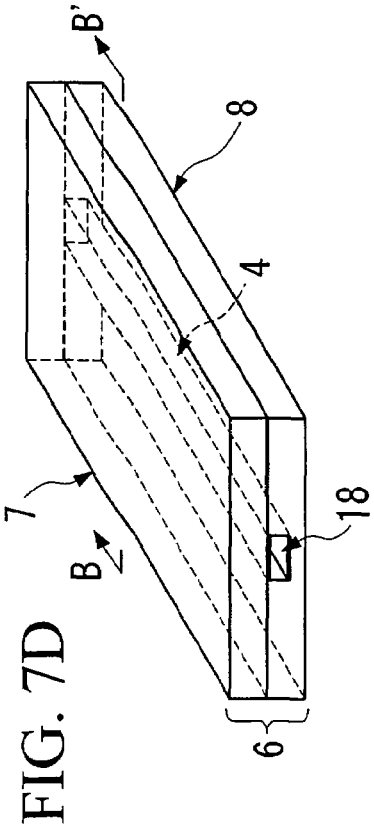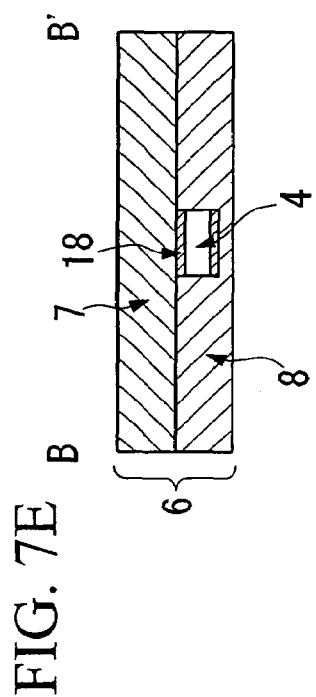
FIG. 7A
FIG. 7B
FIG. 7C
FIG. 7D
FIG. 7E

MICROCHANNEL STRUCTURE BODY

TECHNICAL FIELD

The present invention relates to a fine channel device and a gas treatment apparatus. Priority is claimed on Japanese Patent Application No. 2003-075899, filed Mar. 19, 2003, the content of which is incorporated herein by reference.

BACKGROUND ART

In recent years, much attention has been focused on research using fine channel devices, wherein fine channels with a length of several cm, and a width and depth within a range from the sub-micron level to several hundreds of µm are formed on top of a square glass substrate with a side dimension of several cm, and chemical reactions are then conducted by introducing fluids into these fine channels. Due to the effects of shorter intermolecular distances within the microspaces, and larger specific interfacial area, these fine channels enable highly efficient chemical reactions to be conducted (for example, see H. Hisamoto et al., Fast and high conversion phase-transfer synthesis exploiting the liquid-liquid interface formed in a fine channel chip, Chem. Commun., 2001, pp. 2662 to 2663).

Tests are also being conducted into the industrial utilization of chemical reactions within fine channels, while still retaining the inherent characteristics of these types of microspaces. In such cases, because of the small size of the microspace, the production volume or discharge volume per unit of time from a single fine channel is necessarily small. However, if a plurality of fine channels can be arranged in parallel, then the production volume or discharge volume per unit of time can be increased, while still retaining the characteristics of the fine channels. Accordingly, tests have been conducted in which, for example, a plurality of fine channel substrates each containing a single fine channel are prepared, and these substrates are then laminated together, with common portions such as the reaction solution inlets or reaction product outlets interconnecting via vertical through holes (for example, see Japanese Unexamined Patent Application, First Publication No. 2002-292275).

It is said that conducting large scale chemical reactions in this manner, while retaining the characteristics of the microspaces, is possible by either increasing the degree of integration of fine channels, which represent the minimum unit, in the planar direction, or laminating substrates together three dimensionally. However, conventionally, distributing fluids equally to fine channels arranged in either a planar or three dimensional structure has proven to be extremely difficult.

Furthermore, in the preparation of typical semiconductor devices, tests have been conducted in which, during a film formation process such as CVD (chemical vapor deposition) for forming a thin film of a different material from the base material on top of a base material such as Si, which is the most representative semiconductor substrate material, a gas such as $N_2O$ or $NH_3$ is activated using either a plasma or a heated metal catalyst, and then used to dope the semiconductor base material, thereby forming a thin film of SiN or the like (for example, see Japanese Unexamined Patent Application, First Publication No. Hei 10-83988).

However, methods that use a plasma require the generation of very high voltages of several dozen KV or higher, meaning the apparatus tend to be very large. Furthermore, generation of interface defects caused by the injection into the semiconductor substrate material of high-energy charged particles generated within the plasma is unavoidable. Methods that use a heated metal catalyst require heating to very high temperatures. For example, the activation of $NH_3$ requires heating to at least 1600° C. Semiconductor film formation apparatus typically use quartz glass tube or glass boats. However, because the softening point of quartz, which is the temperature at which the quartz begins to expand at a rate of 1 mm per minute, is approximately 1600 to 1700° C., quartz containers cannot be used. Accordingly, special containers made from highly heat resistant ceramic are necessary.

The present invention takes the conventional situation described above into consideration, with an object of providing a fine channel device in which fluids can be distributed equally to a plurality of fine channels disposed in either a planar or three dimensional arrangement. Furthermore, the invention also provides a gas treatment apparatus that uses this fine channel device, and enables the treatment of gases, including activation, decomposition, mixing, and reaction and the like, to be conducted more efficiently than has conventionally been possible. The term "treatment" in gas treatment apparatus refers to treatments such as the activation or decomposition of a fluid, or the mixing or reaction of a plurality of gases.

DISCLOSURE OF INVENTION

The present invention provides a fine channel device comprising at least one inlet opening for introducing a gas, at least one inlet path interconnecting with the inlet opening, at least one fine channel, which interconnects with the inlet path and distributes and feeds the gas equally, a discharge path which interconnects with the fine channel and discharges the gas, and at least one discharge opening interconnecting with the discharge path; wherein an inner diameter of the inlet path is greater than an internal diameter of the fine channel, and the inner diameter of the inlet path increases gradually with increasing distance from a position where the inlet opening and the inlet path interconnect with each other, or remains identical with increasing distance from the interconnection position.

BRIEF DESCRIPTION OF THE DRAWINGS

FIG. 7A is a schematic perspective view showing a case in which at least one section of metal is disposed inside either all, or a portion, of a fine channel.

FIG. 7B is a schematic perspective view showing a case in which at least one section of metal is disposed inside either all, or a portion, of a fine channel.

FIG. 7C is a schematic cross-sectional view along the line A-A' of FIG. 7B.

FIG. 7D is a schematic perspective view showing a case in which at least one section of metal is disposed inside either all, or a portion, of a fine channel.

FIG. 7E is a schematic cross-sectional view along the line B-B' of FIG. 7D.

BEST MODE FOR CARRYING OUT THE INVENTION

The present invention relates to a fine channel device containing a plurality of fine channels for conducting gas treatments such as chemical reactions, with a fine channel shape that distributes the gas equally to the plurality of fine channels, and also relates to a gas treatment apparatus that uses this fine channel device to conduct chemical reactions, particularly gas activation, decomposition, mixing, or reaction or the like, within the fine channels.

The inner diameter of the inlet path is greater than that of the fine channels, and either increases gradually, or remains identical, with increasing distance from the position where the inlet opening and the inlet path are interconnecting with each other. As a result, gas can be distributed equally to the plurality of fine channels disposed in either a planar or three dimensional arrangement within the fine channel device, and two or more gases can also be mixed. Furthermore, a catalyst or metal may also be disposed inside either all, or at least a portion, of each fine channel. The catalyst may be either a metal or a compound that contains a metal. By using the metal as a catalyst and/or a heater, or using the metal as an electrode for electrical discharge, the introduced gas can be activated, decomposed, and/or reacted. The inventors discovered that this enabled the aforementioned problems associated with the conventional technology to be resolved, and were hence able to complete the present invention.

As follows is a more detailed description of the present invention. Preferred embodiments of the present invention are described with reference to the drawings, but the present invention is in no way limited to the examples presented below. For example, suitable combinations of different structural elements of the different examples are also possible.

First is a description of feeding a gas equally through a plurality of fine channels, using a fine channel device of the present invention.

A fine channel device of the present invention has an inlet opening for introducing a gas and an inlet path interconnecting with this inlet opening, fine channels that interconnect with the inlet path and are used for distributing and feeding the gas equally, a discharge path that interconnects with each fine channel and is used for discharging the gas, and a discharge opening interconnecting with this discharge path. The inner diameter of the inlet path is greater than the inner diameter of the fine channel, and either increases gradually, or remains identical, with increasing distance from the position where the inlet opening and the inlet path are interconnecting with each other. In those cases where the diameter increases, it may either increase in a stepwise manner, or increase in a cone-like manner, and an appropriate shape can be selected in accordance with the conditions.

Figure 1:
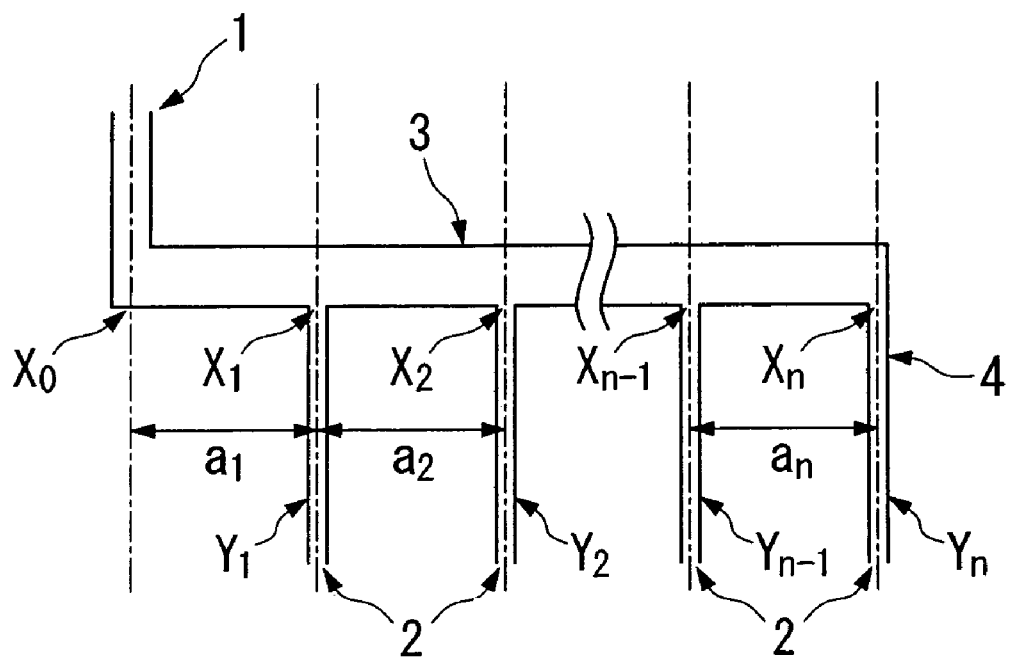
FIG. 1 is a schematic plan view showing the most basic fine channel shape according to the present invention.

Here, the most basic outline of a fine channel device of the present invention is shown in FIG. 1. An inlet opening (1) for introducing a gas is provided at one end of an inlet path (3), and fine channels (4) with inner diameters (channel widths) that are smaller than that of the inlet path are provided. A discharge opening (2) is provided at the end of each fine channel (4). In this description, the term fine channel refers to a channel with an inner diameter of no more than approximately 500 μm. Furthermore, the term inlet path refers to a channel with an inner diameter larger than 500 μm but no more than several cm, and preferably no more than 1 cm. In the present invention, in those cases where the cross-section is not circular, the term inner diameter is defined as being the inner diameter of the circular cylinder with the same cross-sectional area. Furthermore, the cross-sectional shape of the channels in the present invention may be any shape, although semicircular or rectangular shapes are preferred. There are no particular restrictions on the inner diameter of the channel connecting the inlet opening and the inlet path, although an inner diameter of approximately the same size as that of the inlet path is preferred.

There are no particular restrictions on the positioning of the fine channels, provided they are positioned at a different location from the inlet opening, and interconnect with the inlet path. Specifics of this requirement are described using FIG. 1. FIG. 1 is a fine channel device containing n fine channels, from a fine channel $Y_1$ positioned closest to the inlet opening, through to a fine channel $Y_n$ positioned farthest from the inlet opening, each of which interconnects with the inlet path. The position at which the inlet opening interconnects with the inlet path is labeled $X_0$ (for reasons of simplicity, as shown in the figure, the point at which the center line of the inlet opening intersects with the wall of the inlet path is represented by $X_0$), the position at which the fine channel $Y_1$ interconnects with the inlet path is labeled $X_1$ (as shown in the figure, the point at which the center line of the fine channel intersects with a line that corresponds with the wall of the inlet path is represented by $X_1$), and the length along the inlet path between the interconnection position $X_0$ and the interconnection position $X_1$ is labeled $a_1$. Furthermore, each of the interconnection positions, fine channels, and distances between fine channels are labeled in sequence, so that the position at which the fine channel $Y_n$, which is farthest from the inlet opening, interconnects with the inlet path is labeled $X_n$, the fine channel that is one position closer to the inlet opening than the fine channel $Y_n$, is labeled $Y_{n-1}$, the position at which the fine channel $Y_{n-1}$ interconnects with the inlet path is labeled $X_{n-1}$, and the length along the inlet path between the interconnection position $X_{n-1}$ and the interconnection position $X_n$ is labeled $a_n$. In order to enable equal distribution of the gas to the fine channels from $Y_1$ to $Y_n$, the fine channels are preferably arranged so that $a_2$ to $a_n$ are equal. In addition, by making $a_1$ to $a_n$ equal, this effect can be further improved.

However, in the present invention, the fine channels may also be arranged in positions in which $a_2$ to $a_n$ are not equal, and the lengths between adjacent interconnection positions can be appropriately selected or altered in accordance with the materials used, and the production conditions and the like. For example, configurations in which the length either increases or decreases sequentially from $a_1$ to $a_n$ are also possible.

Furthermore, in this type of fine channel device, the fine channel device may comprise either 1, or 2 or more fine channel substrates with fine channels. Furthermore, a structure in which a plurality of inlet paths are provided on a substrate(s), and these inlet paths interconnects each other in a fine channel substrate(s), and therefore in fine channels, is also possible.

FIG. 2 to FIG. 5 are schematic illustrations showing a number of embodiments of the present invention. As already mentioned above, the present invention is in no way limited to these examples, and it should be understood that various modifications are possible without departing from the spirit or scope of the present invention.

Figure 2:
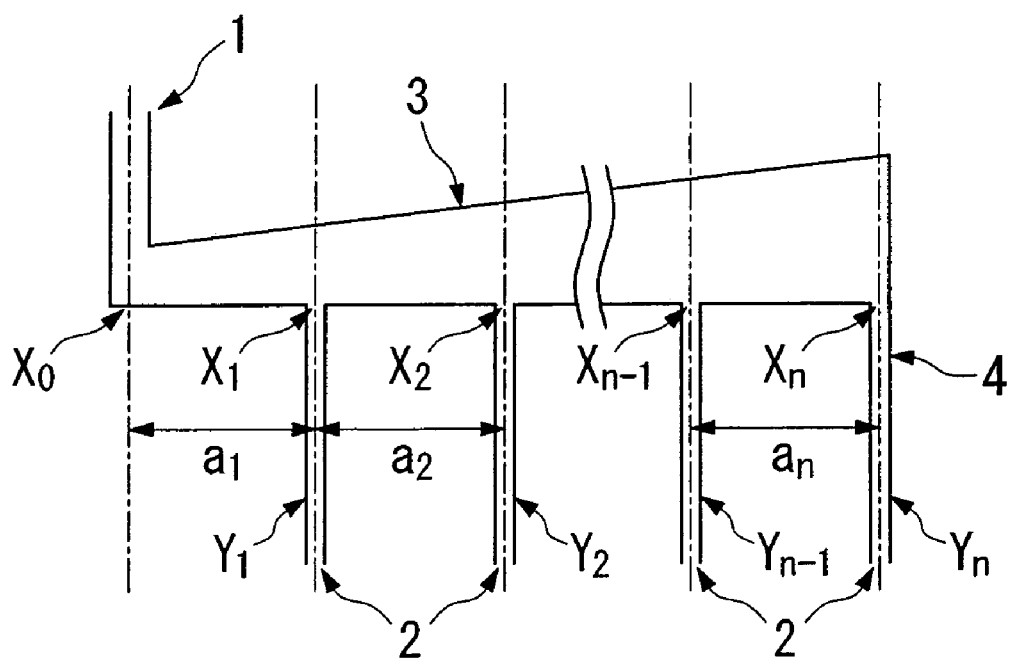
FIG. 2 is a schematic plan view showing one example of fine channel shape according to the present invention.

FIG. 2 is an example in which the inner diameter of the inlet path (3) increases gradually with increasing distance from the interconnection position of the inlet opening (1). The ratio in which the cross-sectional area of the inlet path, wherein the cross-section is perpendicular to the direction of travel, increases can be selected as desired. Although a preferred ratio of change varies in accordance with a linear function from the minimum cross-sectional area of the inlet path through to the maximum cross-sectional area. In the present invention, the cross-sectional shape of the inlet opening is preferably circular, although any other shape can also be selected. Suitable shapes include circular, elliptical, semicircular, square shapes and the like.

Figure 3:
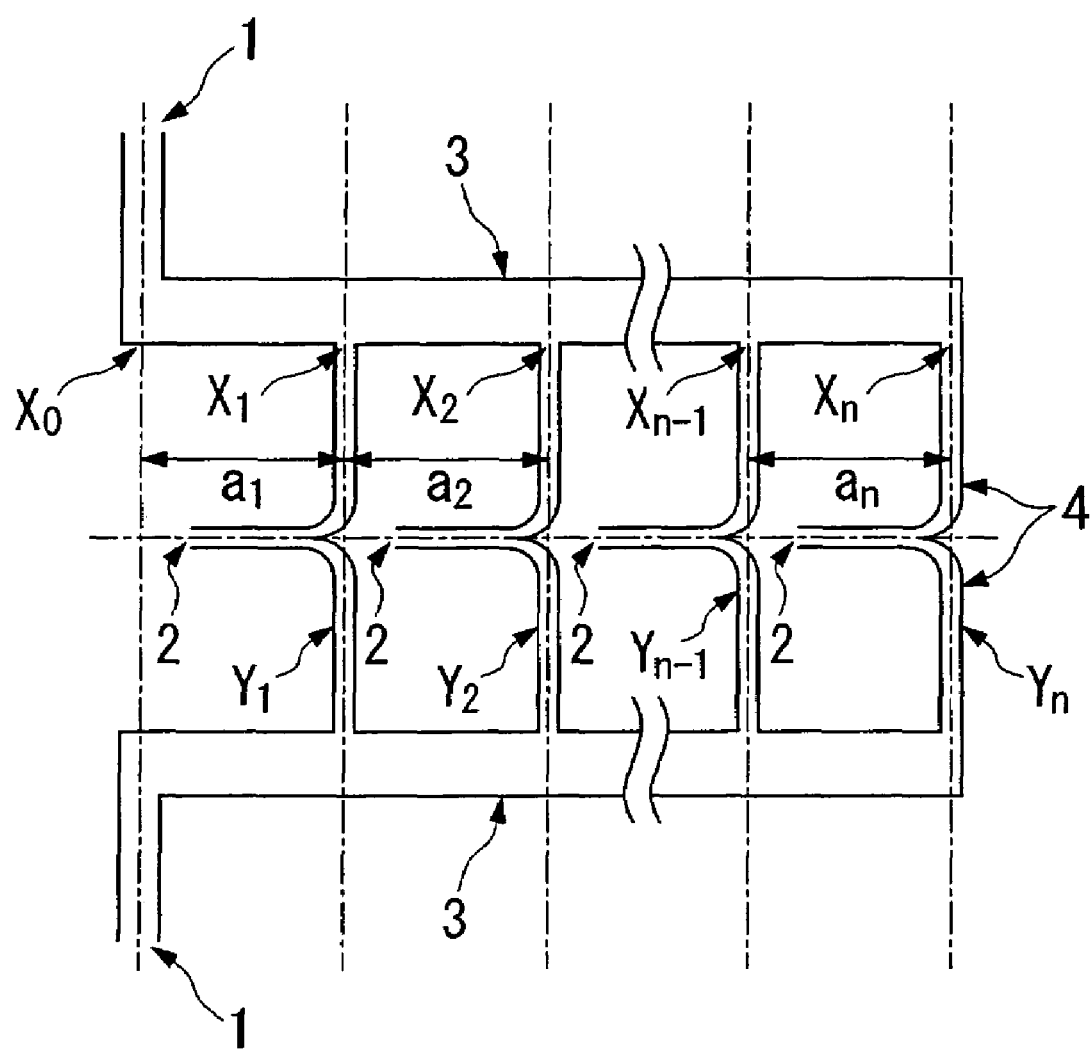
FIG. 3 is a schematic plan view showing one example of fine channel shape according to the present invention.

FIG. 3 is an example in which fine channels (4) labeled from $Y_1$ to $Y_n$ are drawn from two inlet paths (3) and then merge in a series of Y-shaped arrangements. Using the fine channel device shown in FIG. 3, by introducing gases that are to undergo a chemical reaction or gases that are to be mixed into the two inlet paths respectively, the gases can be distributed equally to the plurality of Y-shaped fine channels. Accordingly, the chemical reaction or mixing can be conducted under the same conditions within all of the fine channels.

Figure 4B:
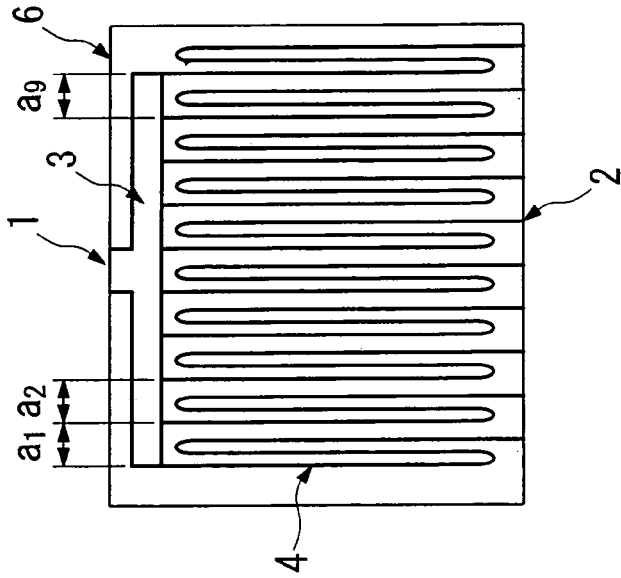
FIG. 4B is a schematic plan view showing an enlargement of one portion of FIG. 4A.
Figure 4A:
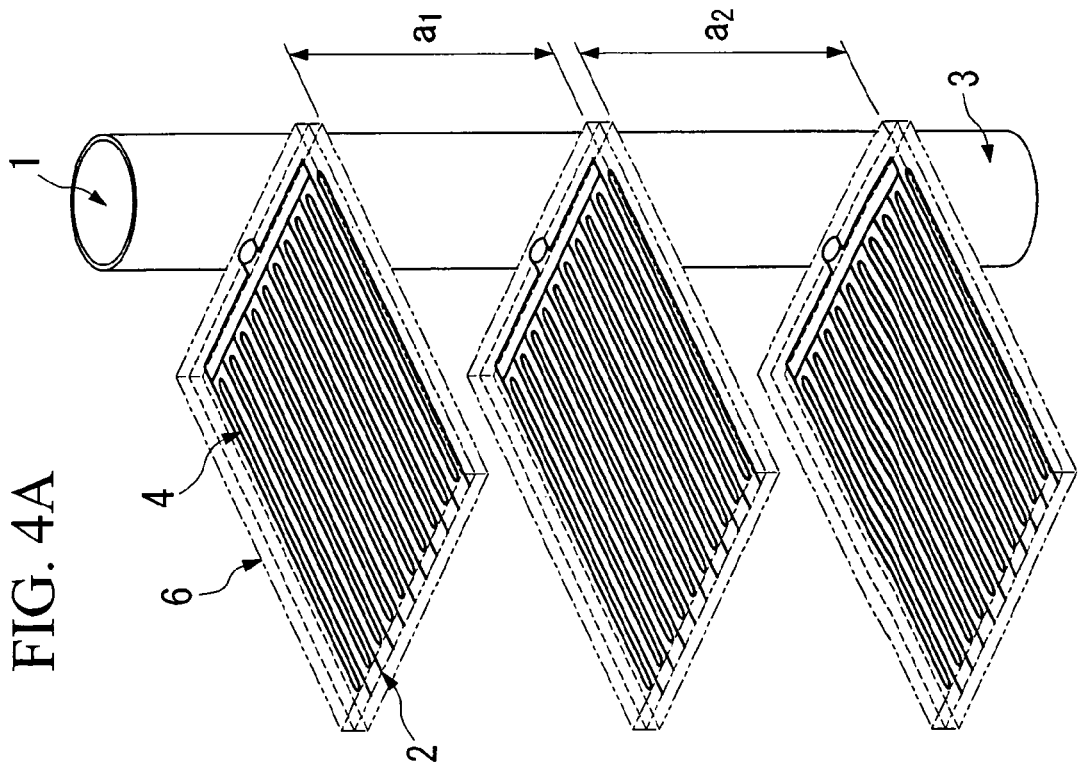
FIG. 4A is a schematic illustration showing one example of fine channel shape according to the present invention.

FIG. 4A is an example in which three fine channel devices (6) containing fine channels (4) are arranged vertically with respect to a single inlet path (3), so that the surface of each structure is perpendicular to the long axis direction of the inlet path, and is positioned with a specified separation from the adjacent structure. The inlet opening (1) is provided in the upper portion of the inlet path (3). As shown in FIG. 4B, each of the fine channel devices shown in FIG. 4A is a fine channel device (6) containing fine channels (4) that are positioned with equal spacing along the inlet path (3). Dividing the inlet path (3) into two separate stages, is possible according to the present invention. Furthermore, in the present invention, the fine channel device (6) can be structured as a type of fine channel (4). Accordingly, the configuration of FIG. 4A can be considered one example of the configuration of FIG. 1.

Figure 5:
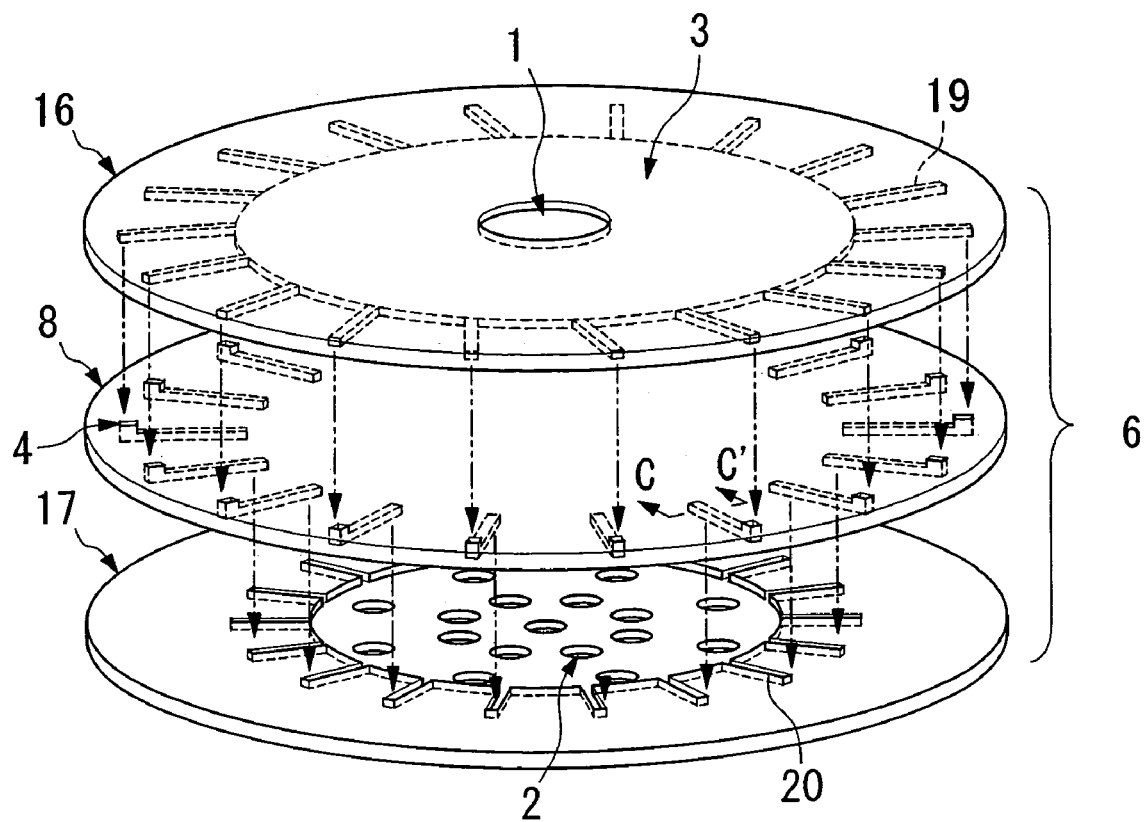
FIG. 5 is a schematic perspective view showing the assembly process for one example of a fine channel shape used in an example 3 of the present invention.

FIG. 5 is an example of a fine channel device (6) in which an upper cover (16), comprising an inlet opening (1) and an inlet path (3) formed on a circular disc-shaped substrate, a fine channel substrate (8), comprising a plurality of fine channels (4) that interconnect with the inlet path of the upper cover and are arranged radially around a circular disc-shaped substrate which has the same size as the upper cover, and a lower cover (17), comprising a plurality of discharge openings (2), which interconnect with the fine channels, formed in a circular disc-shaped substrate of the same size as the upper cover, are bonded together.

The type of fine channel substrate containing fine channels described above can be produced by any appropriate method, and suitable examples include direct processing of a substrate material such as quartz, ceramic, silicon, metal, or resin using a technique such as mechanical processing, laser processing, or etching. Furthermore, if the substrate material is ceramic or resin, then the fine channel substrate can also be prepared by molding, using a casting mold of a metal or the like that includes fine channel shapes. Generally, a fine channel device described above is used with a cover bonded to the fine channel substrate. The method used for bonding the cover and the fine channel substrate can employ the bonding method best suited to the substrate material used. For example, in those cases where the substrate material is a ceramic or metal, methods that use solder or adhesives are used, in the cases where the substrate material is quartz or resin, thermocompression bonding is used, by applying a load under high temperature conditions within a range from 100° C. through to a temperature several hundred degrees higher than 1000° C., and in those cases where the substrate material is silicon, a method is used in which the substrate surface is activated by washing, and bonding is then conducted at room temperature. The fine channel substrate may be any color, and may be naturally colored, artificially colored, transparent, or translucent. If transparent, then the interior of the substrate can be checked visually, and if colored, then deterioration or reaction of the materials inside the substrate due to the action of light can be prevented.

As follows is a description of a treatment apparatus, that uses a fine channel device of the present invention to effect the mixing, activation, decomposition or reaction of gases introduced into the fine channels.

Figure 6:
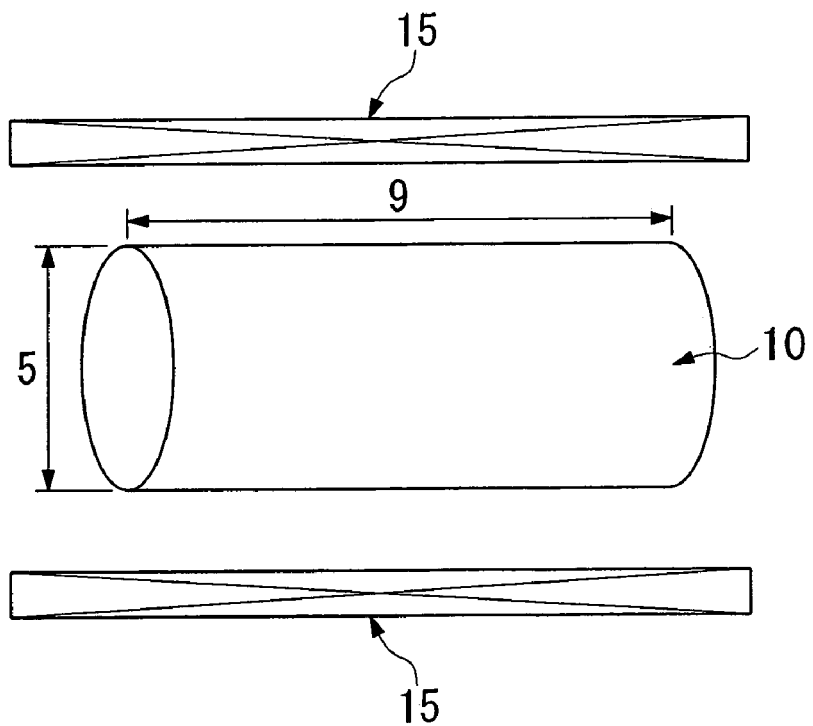
FIG. 6 is a schematic perspective view of a quartz conduit pipe typically used for activating or decomposing gases.

The treatment apparatus of the present invention is a gas treatment apparatus comprising a fine channel device described above, and conduit piping that interconnects with the aforementioned inlet opening and is used for feeding the gas. By using a treatment apparatus with this type of structure, gas can be distributed equally within the fine channel device portion, and a superior treatment apparatus that incorporates the conduit piping for feeding the treatment target gas to the fine channel device can be realized. Accordingly, treatments such as mixing, activation, heating, or decomposition of the gas and the like can be conducted efficiently and precisely. In the case of activation or decomposition of a gas, normally a conduit pipe (10) for introducing gas such as that shown in FIG. 6, made of quartz or the like and with a pipe diameter (5) within a range from several cm to approximately 20 cm (specifically, from 1.0 to 1.5 cm for example), and a pipe length (9) of approximately several dozen cm (specifically, from 15 to 20 cm for example) is heated from externally with a heating device or member such as a heater (15). In this case, the surface area per unit volume (the specific surface area) for the contact between the heated quartz conduit pipe and the gas, assuming the pipe diameter is 5 cm and the pipe length is 20 cm, is 80 m$^{-1}$ (formula: internal surface area of the pipe/pipe volume). In contrast, the surface area per unit volume (the specific surface area) of the fine channels of a quartz fine channel device such as that shown in FIG. 4(b), comprising, for example, 10 fine channels with a width and depth of 500 μm and a channel length of 20 cm is 8000 m$^{-1}$ (formula: internal surface area of the channels/channel volume). As a result, if the respective times taken for a gas to pass through the conduit pipe of FIG. 6 and the fine channel device of FIG. 4(b) are the same, then because the specific surface area over which the heated quartz and gas make contact of the fine channel device is 100 times larger than the specific surface area for the conduit pipe, the heating efficiency of the fine channel device is approximately 100 times that of the conduit pipe. Accordingly, the gas can be activated or decomposed approximately 100 times more quickly. On the basis of this result, it is clear that a relatively short fine channel length is able to achieve a similar level of activation or decomposition to a conduit pipe of the size described above. If the fine channel width and depth described above are used, then the length of the fine channels need only be around 200 μm. Consequently, by using the present invention, a device for activating or decomposing gases can be reduced in size dramatically.

Furthermore, in a fine channel device or gas treatment apparatus of the present invention, as shown in FIG. 7A, at least one portion of metal (18) may be disposed along either all, or one or more portions, of the walls of the fine channel (4). In this description, disposing metal inside a fine channel may refer to inserting a metal wire, with a diameter that is no more than the internal diameter of the fine channel or with a diameter that is capable of being inserted inside the channel, as shown in FIG. 7A, or may also refer to using a conventional method such as deposition, sputtering or CVD or the like to form a thin metal film along either all, or one or more portions, of the walls of the fine channel (4), as shown in FIG. 7B and FIG. 7C, as well as FIG. 7D and FIG. 7E. Furthermore, the metal is preferably a material that exhibits a catalytic effect in activating or decomposing a gas, and moreover, a metal that when placed inside the fine channel can also be used directly as a heater, by heating the metal, is particularly desirable. Examples of this type of metal, for example for the activation or decomposition of $N_2O$ (nitrous oxide) or $NH_3$ (ammonia) gases, include platinum, tungsten, molybdenum, tantalum, titanium, ruthenium, palladium, and chromium. At least one energy generating member for imparting energy to the catalyst may be incorporated in the present invention.

Devices such as the apparatus and method used for heating the metal may also involve providing a heating device such as a heater, outside either the fine channel device or the gas treatment apparatus, and then heating the metal inside the fine channels, thereby heating the gas introduced into the fine channels. Furthermore, heating may also be conducted by connecting the metal disposed on the inside walls of the fine channels of the aforementioned fine channel device or gas treatment apparatus with at least one current generation member or device (power supply) used for generating a current, and then causing a current to flow through the metal, or by using electromagnetic induction to generate an eddy current within the metal, thereby causing heating. By using such techniques, a metal catalytic effect can be added to the increase in heating efficiency achieved through the large specific surface area of the fine channels, meaning even more efficient activation, decomposition, mixing, reaction of gases or the like can be carried out. In the present invention, the term device may include apparatus, methods, processes, members, or portions or the like.

Furthermore, as shown in FIG. 7D and FIG. 7E, by disposing metal in a number of locations on separate portions of the internal walls of fine channels within the fine channel device or gas treatment apparatus, and then applying a potential difference across the separate sections of metal to generate an electric field therebetween, electrical discharge (plasma generation) can be achieved within the gas inside the fine channels, thereby enabling activation, decomposition, mixing, or reaction of introduced gases.

Furthermore, the fine channel device or gas treatment apparatus of the present invention may also include at least one voltage generation device for generating an electric field between the sections of metal disposed at separate locations on the walls inside the fine channels. Typically, if a 10 mm gap is provided between sections of metal under normal atmospheric conditions, then electrical discharge can be achieved by applying a potential difference between the sections of metal equivalent to a direct current of approximately 10 KV.

In such a case, the electric field between the metal sections is $1\times10^6$ V/m. In the case of a fine channel according to the present invention, if the distance between the metal sections shown in FIG. 7D, namely the depth of the fine channel, is 10 μm, then in order to achieve an electric field of $1\times10^6$ V/m, an approximately 10 V direct current power source is required. In contrast with the power source apparatus required to generate a direct current high voltage of 10 KV, in the present invention, one or several dry cells can be used to generate the direct current 10 V that is required for the present invention. Accordingly, in the present invention, the voltage supply apparatus can be simplified significantly, and yet electrical discharge still generated within the fine channels, enabling the activation, decomposition, mixing, or reaction of the introduced gases.

In this manner, by using a fine channel device or gas treatment apparatus according to the present invention, treatments such as the mixing, activation, decomposition, or reaction of gases can be conducted with comparative ease.

Specifically, in the case of activation of a gas, the gas is introduced into the fine channels of the aforementioned fine channel device, the introduced gas is heated, and/or a voltage is applied across the plurality of metal sections disposed inside the fine channels, thereby causing electrical discharge within the gas (generation of a plasma) and enabling the gas to be activated.

Furthermore, a gas that has been activated inside the fine channels of a fine channel device or gas treatment apparatus according to the present invention may also be brought into contact with a substrate provided outside the fine channel device or gas treatment apparatus. This contact can be used to form a uniform film, by forming a film derived from the activated gas on the substrate.

In addition, the introduced gas can also be decomposed or reacted by either heating, or passing a current through the gas. Accordingly, a fine channel device or gas treatment apparatus of the present invention is preferably a fine channel device that includes a heating device outside of the fine channel device, for heating the gas introduced into the fine channels. Furthermore, in the case of heating, the fine channel device and the conduit pipes used in the present invention are preferably produced from quartz glass, and even more preferably from synthetic quartz glass, and particularly high-purity synthetic quartz glass, in order to enable the fine channel device to withstand high temperatures, specifically temperatures of 1000° C. or higher.

Furthermore, a fine channel device or gas treatment apparatus of the present invention can also be used as a reactor for gas-phase reactions. One specific example is a reaction technique wherein benzene and ammonia gases are introduced into the fine channels, and the aforementioned metal catalyst such as platinum or tungsten is heated, either electrically or from externally, to increase the catalytic efficiency, thereby enabling aniline to be synthesized directly. If a fine channel device of the present invention is used for a chemical reaction in this manner, then a reaction field with a restricted space can be provided inside the fine channels, thereby increasing the collision frequency of the reactants and improving the reaction efficiency. Furthermore, the advantage of the characteristics of the fine channels can be used sufficiently by the present invention, for example, such as synthesis of the target material can be conducted in a very short time period within a range from several microseconds to several milliseconds, even if reactants that are extremely difficult to activate, or reactants that are unstable, are used for a reaction.

In addition, in the case of mixing two or more different gases, mixing can be achieved, for example, by introducing the gases into the fine channel device shown in FIG. 3, and then bringing the gases into contact with each other.

There are no particular restrictions on the gases that can be used in the treatments described above, provided the treatment does not depart from the spirit or scope of the present invention. Examples of suitable gases include tetraethoxysilane ($Si(OC_2H_5)_4$), dichlorosilane ($H_2SiCl_2$), and nitrogen. Furthermore, nitric oxide or ammonia can be used, and both of these gases can also be used at the same time.

A fine channel device of the present invention includes an inlet opening for introducing a gas and an inlet path interconnecting with this inlet opening, fine channels that interconnect with the inlet path and are used for distributing and feeding the gas equally, a discharge path that interconnects with each fine channel and is used for discharging the gas, and a discharge opening interconnecting with this discharge path. In addition, the inner diameter of the inlet path is greater than that of the fine channel, and either increases gradually, or remains identical, with increasing distance from the position where the inlet opening and the inlet path are interconnecting with each other. By using such a structure, the gas can be distributed equally to each of the fine channels.

Furthermore, there are no particular restrictions on the positioning of the fine channels, insofar as they interconnect with the inlet path at a different location from the inlet opening. Specifics of this requirement are shown in FIG. 1, which shows a fine channel device containing n fine channels, from a fine channel $Y_1$ positioned closest to the inlet opening through to a fine channel $Y_n$ positioned farthest from the inlet opening, each of which interconnects with the inlet path, wherein if the position at which the inlet opening interconnects with the inlet path is labeled $X_0$, the position at which the above fine channel $Y_1$ interconnects with the inlet path is labeled $X_1$, the length along the inlet path between the interconnection position $X_0$ and the interconnection position $X_1$ is labeled $a_1$, and thereafter each of the interconnection positions, fine channels, and distances between fine channels are labeled in sequence, so that the position at which the fine channel $Y_n$ farthest from the inlet opening interconnects with the inlet path is labeled $X_n$, the fine channel that is one position closer to the inlet opening than the fine channel $Y_n$ is labeled $Y_{n-1}$, the position at which the fine channel $Y_{n-1}$ interconnects with the inlet path is labeled $X_{n-1}$, and the length along the inlet path between the interconnection position $X_{n-1}$ and the interconnection position $X_n$ is labeled $a_n$, then in order to enable equal distribution of the gas to the fine channels from $Y_1$ to $Y_n$, the fine channels are preferably arranged so that $a_2$ to $a_n$ are equal. In addition, by making all of $a_1$ to $a_n$ equal, this effect of enabling equal distribution to each of the fine channels can be further improved.

Furthermore, in this type of fine channel device, the fine channel device may comprise either 1, or 2 or more fine channel substrates with fine channels. Furthermore, a structure in which a plurality of inlet paths are provided on the substrate, is also possible. These inlet paths may interconnects each other in a fine channel substrate(s), and therefore in fine channels. So doing enables the treatment of a large volume of gas.

Furthermore, another aspect of the present invention is a gas treatment apparatus comprising a fine channel device described above, and conduit piping that interconnects with the aforementioned inlet opening and is used for feeding the gas. By using a treatment apparatus with this type of structure, gas can be distributed equally within the fine channel device portion, a treatment apparatus incorporating the fine channel device, and the conduit piping for feeding the target gas to the fine channel device, can be produced, and treatments such as mixing, activation, heating, or decomposition of the gas and the like can be conducted.

Furthermore, in a fine channel device or gas treatment apparatus of the present invention, at least one section of metal may be disposed along either all, or one or more portions, of the walls of the fine channels. The metal is preferably a material that exhibits a catalytic effect for activating or decomposing a gas, and moreover, a metal that when placed inside the fine channel can be used directly as a heater by heating the metal is particularly desirable. By using such a configuration, treatments such as activation, decomposition, mixing, or reaction of the gas or the like can be conducted even more efficiently. Examples of this type of metal, include iron, tungsten, molybdenum, tantalum, titanium, and vanadium, and of these, the use of tungsten is particularly preferred.

Furthermore, as a devices for heating the metal in the present invention, at least one heating device such as a heater, may be provided outside either the fine channel device or the gas treatment apparatus. By heating the metal inside the fine channels, the gas introduced into the fine channels may be heated. Alternatively, heating may also be conducted by connecting the metal disposed on the inside walls of the fine channels of the aforementioned fine channel device or gas treatment apparatus with at least one current generation member or device (power supply) used for generating a current, and then causing a current to flow to heat the metal. Furthermore, heating may also be conducted by using electromagnetic induction to generate an eddy current within the metal, thereby causing heating. By using such techniques, a metal catalytic effect can be added to the increase in heating efficiency achieved through the large specific surface area of the fine channels, meaning even more efficient activation, decomposition, mixing, or reaction of gases can be carried out.

Furthermore, metal may also be disposed in a number of locations, namely two or more locations, on separate portions of the internal walls of fine channels within the fine channel device or gas treatment apparatus, and a potential difference then applied across the separate sections of metal to generate an electric field therebetween. By so doing, electrical discharge (plasma generation) can be achieved within the gas inside the fine channels, thereby enabling activation, decomposition, mixing, or reaction of introduced gases.

Furthermore, the fine channel device or gas treatment apparatus of the present invention may also include a voltage generation device for generating an electric field between the sections of metal disposed at separate locations on the walls inside the fine channels. By using such a configuration, a power source in the order of several V can be used to cause an electrical discharge within a fine channel with a width of several dozen μm to several hundreds of μm, thereby enabling activation, decomposition, mixing, or reaction of introduced gases. In the present invention, it is possible to simplify a voltage supply device. Specific examples for those values that are not restricted for the fine channels of the present invention are presented below. The width of the fine channels of the present invention are, for example, within a range from 10 to 500 μm, and preferably from 20 to 200 μm, and even more preferably from 50 to 100 μm. The height of the fine channels of the present invention are, for example, within a range from 1 to 100 μm, and preferably from 10 to 50 μm, and even more preferably from 20 to 30 μm.

Moreover, the length of the fine channels of the present invention are, for example, within a range from 0.1 to 20 cm, and preferably from 1 to 10 cm, and even more preferably from 3 to 5 cm.

Furthermore, a fine channel device or gas treatment apparatus of the present invention is preferably a fine channel device that includes a heating device provided outside of the fine channel device for heating the gas introduced into the fine channels. Furthermore, the fine channel device and the conduit pipes may be formed from any material, although formation from fused quartz glass, synthetic quartz glass, or composite quartz glass or the like is preferred. In order to enable the fine channel device to withstand high temperatures, specifically temperatures of 1000° C. or higher, when heated, the fine channel device and conduit pipes of the present invention are preferably formed from high-purity synthetic quartz glass. By using such a configuration, the introduced gas can be heated, and either decomposed or reacted.

EXAMPLES

As follows is a description of examples of the present invention. As already mentioned above, the present invention is in no way limited to the examples presented below, and it should be understood that various modifications are possible without departing from the spirit or scope of the present invention.

Example 1

Figure 8:
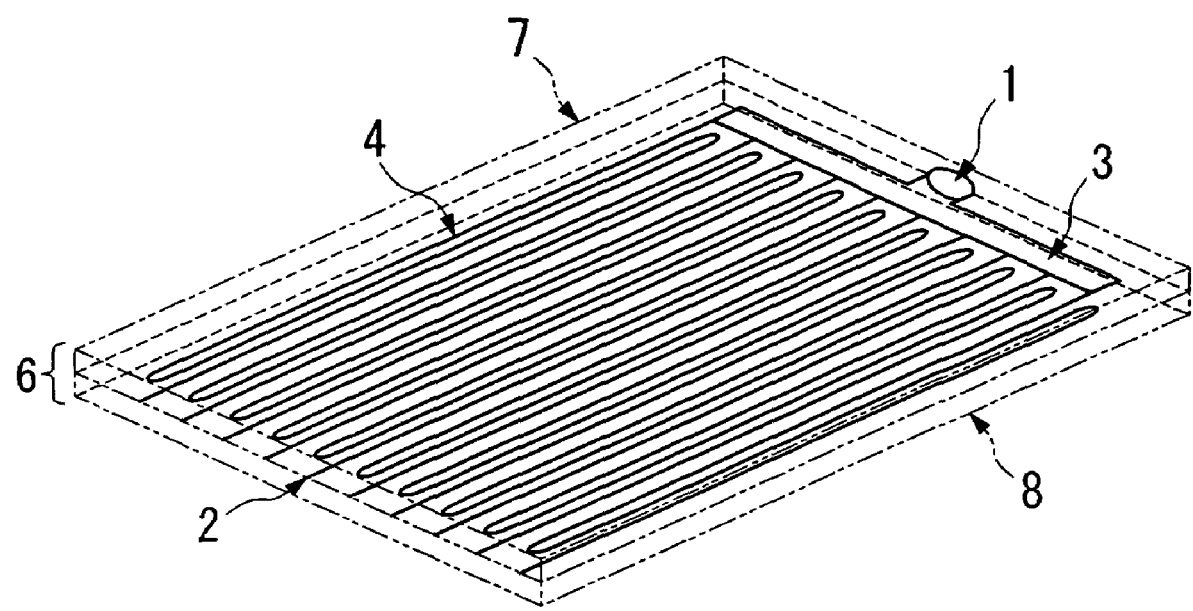
FIG. 8 is a schematic perspective view of a fine channel device used in an example 1.

A fine channel device (6) such as that shown in FIG. 8 was prepared as a first example. Blast processing was used to form an inlet path (3) with a width of 2 mm and a depth of 500 μm, and 10 fine channels (4), each of which interconnects with the inlet path, and has a width of 500 μm, a depth of 500 μm, and a length of 15 cm that includes turn-back positions partway along the fine channel, in a quartz substrate with dimensions of 70 mm×50 mm, and a depth of 1.65 mm. The distance between adjacent interconnection positions, where the 10 fine channels and the inlet path interconnect with each other, was 2 mm. Another quartz substrate of the same size as this fine channel substrate (8) was used as a cover (7), and was bonded to the fine channel-containing surface of the fine channel substrate by thermal bonding, thus producing a fine channel device.

Using a feed pump, $N_2O$ was introduced into the inlet opening (1) of the fine channel device at a flow rate of 10 L/minute, 10 flow rate meters were positioned at the discharge openings of the 10 fine channels, and the discharge flow rate from each fine channel was measured. $N_2O$ was discharged from each fine channel with a flow rate within a range from 0.9 to 1.1 L/minute, confirming that the $N_2O$ was flowing equally through each fine channel.

Example 2

Figures 9A, 9B:
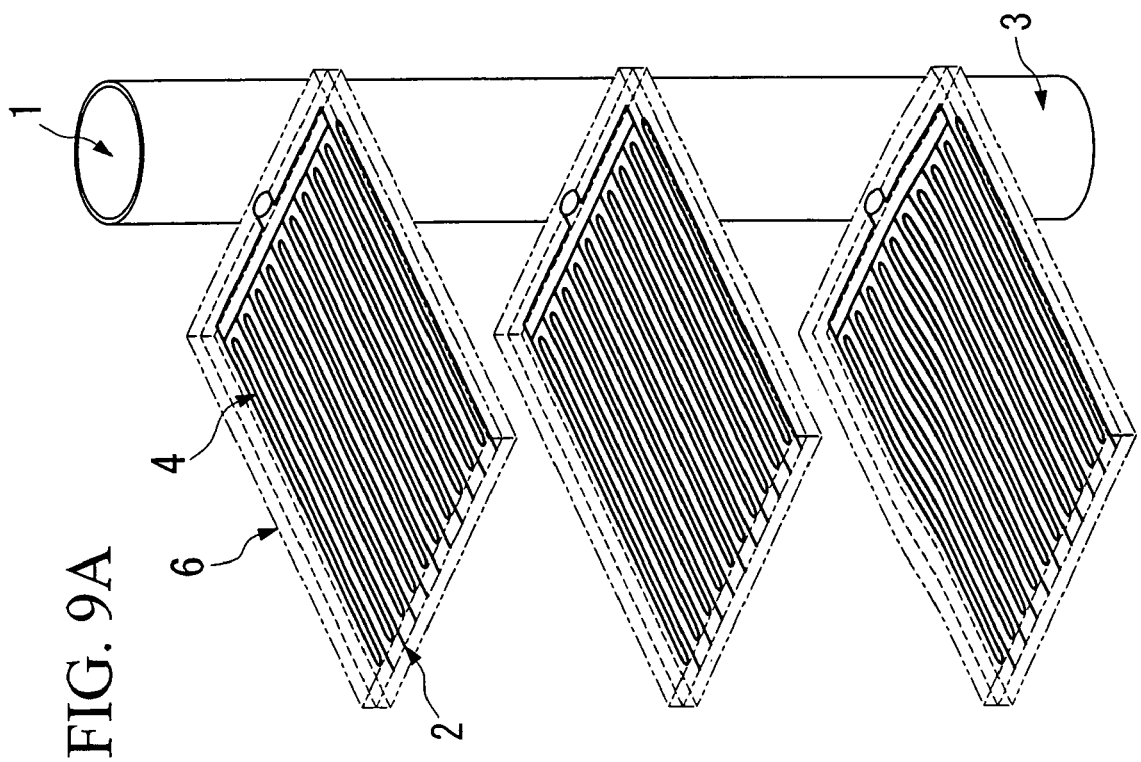
FIG. 9A is a schematic perspective view of a fine channel device used in an example 2.
FIG. 9B is a schematic plan view showing an enlargement of one portion of FIG. 9A.
Figure 10:
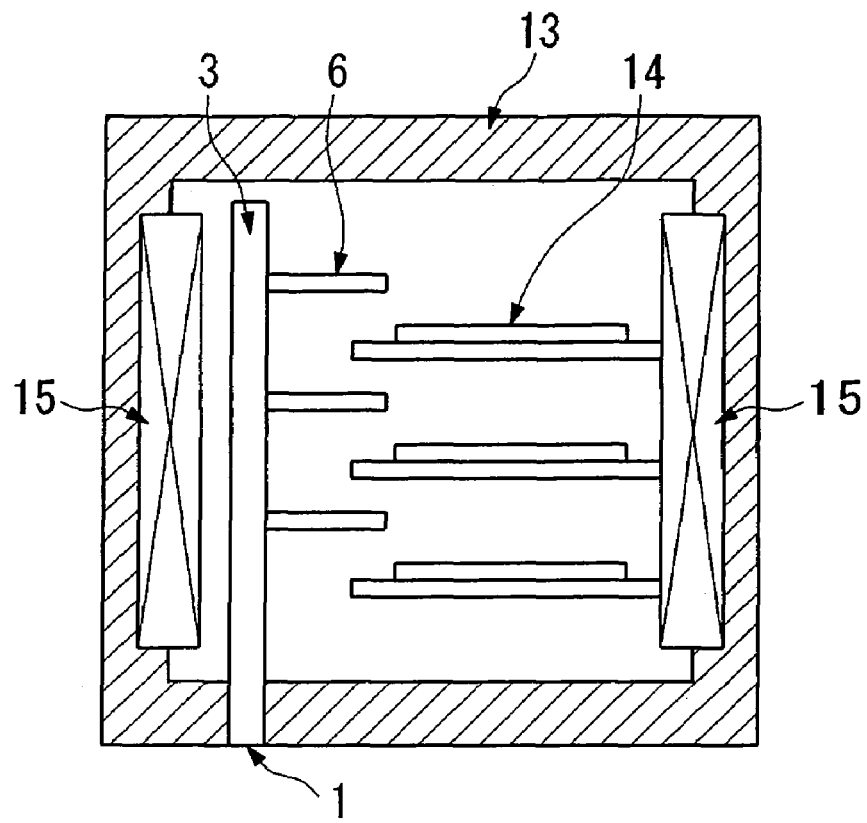
FIG. 10 is a schematic illustration showing one example of the application of the fine channel device used in the example 2 to a CVD apparatus.

A fine channel device (6) such as that shown in FIG. 9A was prepared as a second example. In FIG. 9, three of the fine channel devices shown in FIG. 8 are used. These three fine channel devices all interconnect with the inlet path (3), and are positioned with a 5 cm spacing between the structures. Tungsten wire (12) with a diameter of 0.3 mm is disposed inside the fine channels of these fine channel devices, as shown in FIG. 9B. The fine channel device of the FIG. 9A was placed inside a CVD apparatus (13) such as that shown in FIG. 10, and heated using a heater (15) provided at a furnace of the CVD apparatus. The inside of the CVD apparatus furnace was then evacuated down to 0.3 Torr with a vacuum pump. The heater material was a kanthal material. Subsequently, $NH_3$ gas was introduced through the gas inlet opening at a flow rate of 10 L/minute, forming a SiN film on the surface of Si wafer substrates (14) of diameter 3.5 inches. The Si wafer substrates were positioned 10 mm below the fine channel devices, and 1 mm away from the discharge openings of the fine channel devices. The heater temperature was from 1000 to 1100° C. (a temperature (slow cooling point) slightly lower than the temperature of 1100 to 1200° C., at which internal strain within the quartz can be removed in 15 minutes), lower than the softening point of quartz (1600 to 1700° C.), enabling the formation of an extremely favorable SiN film with very few film defects. Furthermore, the film thickness of the SiN film formed on each of the three Si wafers was from 5 to 7 nm, and extremely uniform films were able to be formed. In this example, the fine channel devices are heated from externally using the heater of the CVD apparatus. However, by connecting the tungsten wire disposed inside the fine channels to a power source, and then either causing a direct current to flow through the wire, or generating eddy currents through electromagnetic induction, the tungsten wire itself could also be used as the heater.

Example 3

A fine channel device (6) such as that shown in FIG. 5 was prepared as a third example. The fine channel substrate was produced by using blast processing to form 18 fine channels of width 500 μm, depth 10 μm, and length 30 mm in a radial pattern in the surface of a quartz substrate with a diameter of 5 inches and a thickness of 1 mm. A through hole of diameter 1 mm was provided at the fine channels, in order to enable interconnection between the inlet path of the upper cover (16), the channel, and the discharge opening of the lower cover (17).

Furthermore, the upper cover (16) was formed from a quartz substrate of the same size as the fine channel substrate, wherein an inlet opening (1) of diameter 2 mm was provided in the center of the substrate, and an inlet path (3) formed from a circular cylindrical concave portion of diameter 110 mm and depth 300 μm, and 18 distribution channels (19) that extend in a radial manner were formed by blast processing.

Furthermore, the lower cover (17) was also formed from a quartz substrate of the same size as the fine channel substrate, wherein a circular cylindrical concave portion of diameter 50 mm and depth 300 μm was formed in the center of the substrate, and 18 recovery channels (20) were also provided. Blast processing was used to form 18 radially positioned through holes of diameter 1 mm in the bottom surface of the concave portion as gas discharge openings.

The fine channel device was formed by bonding the upper cover, the fine channel substrate, and the lower cover together using thermal bonding.

Figure 11:
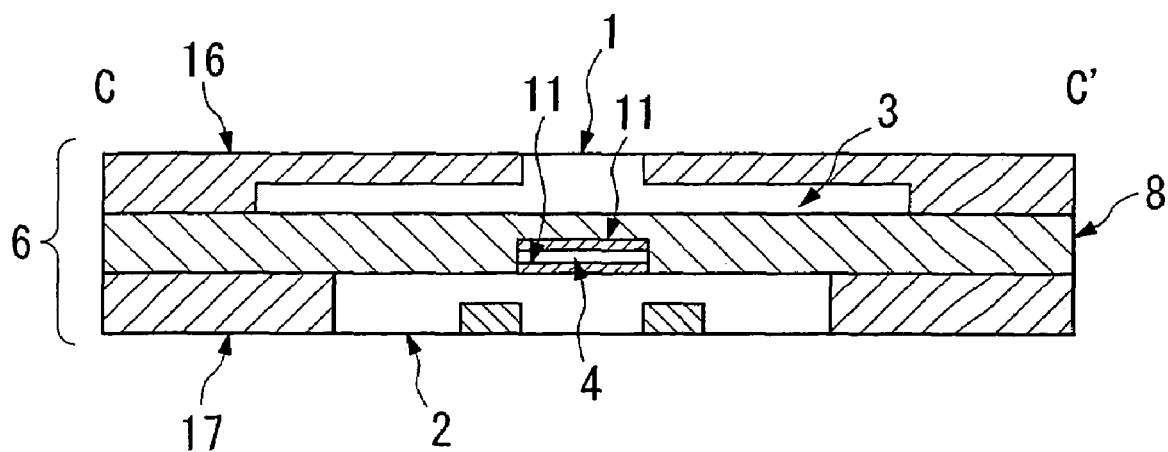
FIG. 11 is a schematic cross-sectional view of a fine channel of the fine channel device used in the example 3, viewed along the line C-C' of FIG. 5.
Figure 12:
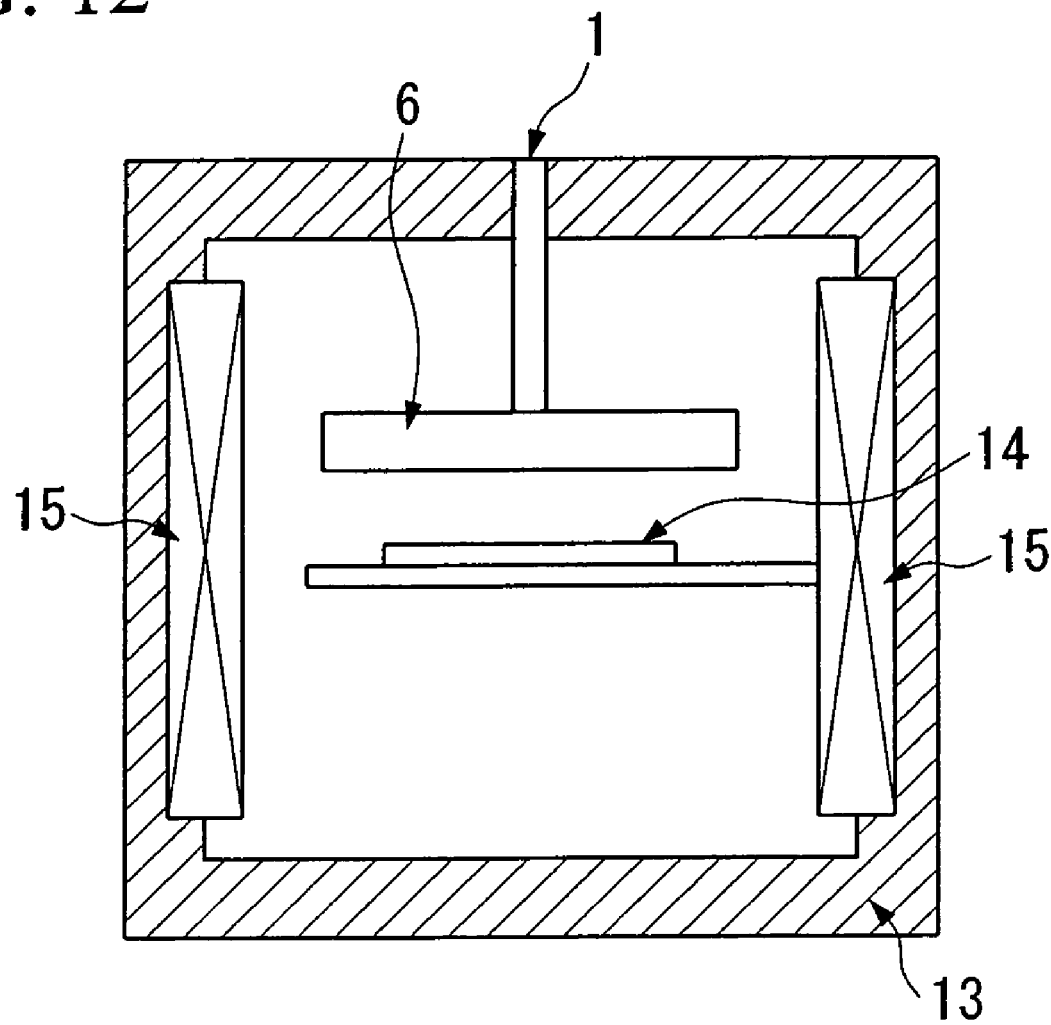
FIG. 12 is a schematic illustration showing one example of the application of the fine channel device used in the example 3 to a CVD apparatus.

Furthermore, as shown in simplified form in FIG. 11, a film of platinum (11) of thickness 100 nm was formed by sputtering in at least one location on the upper and lower surfaces of the fine channels. The platinum film formed on the upper surface was connected to a direct current 10 V power supply via a connection switch, and the platinum of the lower surface was grounded. Fine channel devices of this construction were placed inside a CVD apparatus (13) such as that shown in FIG. 12. The inside of the CVD furnace was then evacuated down to 0.3 Torr with a vacuum pump. Furthermore, the inside of the CVD furnace was heated to 300° C. using the heater (15). Subsequently, $NH_3$ gas was introduced through the gas inlet opening at a flow rate of 5 L/minute, forming a SiN film on the surface of Si wafer substrates (14) of diameter 5 inches. The Si wafers were positioned 10 mm below the fine channel devices. At the same time that introduction of the $NH_3$ gas was commenced, a voltage was applied to the platinum electrode on the upper surface inside the fine channels, thereby causing electrical discharge inside the fine channels, and enabling the formation of extremely favorable SiN films with very few film defects and with a film thickness of about 5 to 7 nm.

INDUSTRIAL APPLICABILITY

The present invention can provide a fine channel device in which a gas can be distributed equally to a plurality of fine channels disposed in either a planar or three dimensional arrangement. Furthermore, the invention also can provide a gas treatment apparatus that uses this fine channel device and enables the treatment of gases, including activation, decomposition, mixing, and reaction and the like, to be conducted more efficiently than has conventionally been possible.

The invention claimed is:

1. A fine channel device comprising:
   at least one inlet opening introducing a gas,
   at least one inlet path interconnecting with the inlet opening,
   at least one fine channel, which interconnects with the inlet path and distributes and feeds the gas equally,
   a discharge path which interconnects with the fine channel and discharges the gas, and
   at least one discharge opening interconnecting with the discharge path;
   wherein an inner diameter of the inlet path is greater than an internal diameter of the fine channel, and the inner diameter of the inlet path increases gradually with increasing distance from a position where the inlet opening and the inlet path interconnect with each other.

2. A fine channel device according to claim 1, wherein the fine channel device contains n fine channels, from a fine channel $Y_1$ positioned closest to the inlet opening through to a fine channel $Y_n$ positioned farthest from the inlet opening, each of which interconnects with the inlet path; and
   $a_2$ to $a_n$, which are lengths along the inlet path between the interconnection positions, are all equal, when a position at which the inlet opening interconnects with the inlet path is labeled $X_0$, a position at which the fine channel $Y_1$ interconnects with the inlet path is labeled $X_1$, a length along the inlet path between the interconnection positions $X_0$ and $X_1$ is labeled $a_1$, and thereafter each interconnection position, fine channel, and distance between fine channels is labeled in sequence, so that a position at which the fine channel $Y_n$ farthest from the inlet opening interconnects with the inlet path is labeled $X_n$, a fine channel that is one position closer to the inlet opening than the fine channel $Y_n$ is labeled $Y_{n-1}$, a position at which the fine channel $Y_{n-1}$ interconnects with the inlet path is labeled $X_{n-1}$, and a length along the inlet path between the interconnection positions $X_{n-1}$ and $X_n$ is labeled $a_n$.

3. A fine channel device according to claim 1, wherein a metal is disposed on all, or at least a portion of, walls of the fine channel.

4. A fine channel device according to claim 3, wherein the fine channel device comprises at least one current generation device for causing current to flow through the metal disposed on a wall of the fine channel device.

5. A fine channel device according to claim 3, wherein the fine channel device comprises at least one voltage generation device for generating an electric field between sections of metal disposed in separate locations on walls of the fine channel device.

6. A fine channel device according to claim 1, wherein the fine channel device comprises heating device provided outside the fine channel device, for heating a gas introduced into the fine channel.

7. A gas treatment apparatus, comprising a fine channel device according to claim 1, and conduit piping which interconnects with the inlet opening and is used for feeding gas.

8. A gas treatment apparatus according to claim 7, wherein the fine channel device and the conduit piping are formed from synthetic quartz glass.

9. A gas treatment apparatus according to claim 7, wherein a metal is disposed on all, or at least a portion of, walls of the fine channel, and further comprising at least one current generation device for causing current to flow through the metal.

10. A gas treatment apparatus according to claim 7, wherein a metal is disposed on one or more walls of the fine channel, and further comprising at least one current generation device for causing current to flow through the metal.

11. A gas treatment apparatus according to claim 7, further comprising at least one heating device provided outside the fine channel device, for heating a gas introduced into the fine channel.

12. A gas treatment apparatus according to claim 7, wherein the gas is at least one of nitric oxide and ammonia.

13. A gas treatment apparatus according to claim 7, wherein a catalyst is disposed on all, or at least a portion of, walls of the fine channel.

14. A gas treatment apparatus according to claim 13, wherein the catalyst is a metal or a compound that comprises a metal.

15. A gas treatment apparatus according to claim 13, further comprising at least one energy generation device for providing energy to the catalyst.

16. A gas treatment apparatus according to claim 13, wherein the gas is at least one of nitric oxide and ammonia.

* * * * *